US009172740B1

(12) United States Patent
Jia et al.

(10) Patent No.: US 9,172,740 B1
(45) Date of Patent: Oct. 27, 2015

(54) ADJUSTABLE BUFFER REMOTE ACCESS

(71) Applicants: Wei Jia, San Jose, CA (US); Qunshan Gu, Hayward, CA (US)

(72) Inventors: Wei Jia, San Jose, CA (US); Qunshan Gu, Hayward, CA (US)

(73) Assignee: GOOGLE INC., Mountain View, CA (US)

( * ) Notice: Subject to any disclaimer, the term of this patent is extended or adjusted under 35 U.S.C. 154(b) by 235 days.

(21) Appl. No.: 13/741,931

(22) Filed: Jan. 15, 2013

(51) Int. Cl.
G06F 15/16 (2006.01)
H04L 29/08 (2006.01)

(52) U.S. Cl.
CPC ..................... *H04L 67/02* (2013.01)

(58) Field of Classification Search
USPC .................. 709/219, 203, 200, 217
See application file for complete search history.

(56) References Cited

U.S. PATENT DOCUMENTS

| 5,452,435 | A | 9/1995 | Malouf et al. |
|---|---|---|---|
| 5,638,114 | A | 6/1997 | Hatanaka et al. |
| 5,731,840 | A | 3/1998 | Kikuchi et al. |
| 5,801,756 | A | 9/1998 | Iizawa |
| 6,021,213 | A | 2/2000 | Helterbrand et al. |
| 6,025,870 | A | 2/2000 | Hardy |
| 6,038,367 | A | 3/2000 | Abecassis |
| 6,091,777 | A | 7/2000 | Guetz et al. |
| 6,195,391 | B1 | 2/2001 | Hancock et al. |
| 6,204,847 | B1 | 3/2001 | Wright |
| 6,243,683 | B1 | 6/2001 | Peters |
| 6,266,337 | B1 | 7/2001 | Marco |
| 6,271,840 | B1 | 8/2001 | Finseth et al. |
| 6,346,963 | B1 | 2/2002 | Katsumi |
| 6,363,067 | B1 | 3/2002 | Chung |
| 6,421,387 | B1 | 7/2002 | Rhee |
| 6,483,454 | B1 | 11/2002 | Torre et al. |
| 6,556,588 | B2 | 4/2003 | Wan et al. |
| 6,577,333 | B2 | 6/2003 | Tai et al. |
| 6,587,985 | B1 | 7/2003 | Fukushima et al. |
| 6,681,362 | B1 | 1/2004 | Abbott et al. |
| 6,684,354 | B2 | 1/2004 | Fukushima et al. |
| 6,704,024 | B2 | 3/2004 | Robotham et al. |
| 6,707,852 | B1 | 3/2004 | Wang |
| 6,711,209 | B1 | 3/2004 | Lainema et al. |
| 6,728,317 | B1 | 4/2004 | Demos |
| 6,732,313 | B2 | 5/2004 | Fukushima et al. |
| 6,741,569 | B1 | 5/2004 | Clark |
| 6,812,956 | B2 | 11/2004 | Ferren et al. |
| 6,816,836 | B2 | 11/2004 | Basu et al. |
| 6,918,077 | B2 | 7/2005 | Fukushima et al. |
| 6,952,450 | B2 | 10/2005 | Cohen |
| 7,007,098 | B1 | 2/2006 | Smyth et al. |
| 7,007,235 | B1 | 2/2006 | Hussein et al. |
| 7,015,954 | B1 | 3/2006 | Foote et al. |
| 7,124,333 | B2 | 10/2006 | Fukushima et al. |
| 7,178,106 | B2 | 2/2007 | Lamkin et al. |
| 7,180,896 | B1 | 2/2007 | Okumura |
| 7,197,070 | B1 | 3/2007 | Zhang et al. |
| D541,293 | S | 4/2007 | Harvey |
| 7,219,062 | B2 | 5/2007 | Colmenarez et al. |
| 7,263,644 | B2 | 8/2007 | Park et al. |
| 7,266,782 | B2 | 9/2007 | Hull et al. |
| D553,632 | S | 10/2007 | Harvey |
| 7,356,750 | B2 | 4/2008 | Fukushima et al. |
| 7,372,834 | B2 | 5/2008 | Kim et al. |
| 7,376,880 | B2 | 5/2008 | Ichiki et al. |
| 7,379,653 | B2 | 5/2008 | Yap et al. |
| 7,447,235 | B2 | 11/2008 | Luby et al. |
| 7,447,969 | B2 | 11/2008 | Park et al. |
| 7,484,157 | B2 | 1/2009 | Park et al. |
| D594,872 | S | 6/2009 | Akimoto |
| 7,567,671 | B2 | 7/2009 | Gupte |
| 7,577,898 | B2 | 8/2009 | Costa et al. |
| 7,607,157 | B1 | 10/2009 | Inoue et al. |
| 7,636,298 | B2 | 12/2009 | Miura et al. |
| 7,664,185 | B2 | 2/2010 | Zhang et al. |
| 7,664,246 | B2 | 2/2010 | Krantz et al. |
| 7,680,076 | B2 | 3/2010 | Michel et al. |
| 7,684,982 | B2 | 3/2010 | Taneda |

(Continued)

FOREIGN PATENT DOCUMENTS

| EP | 1777969 | 4/2007 |
|---|---|---|
| JP | 0715711 | 1/1995 |

(Continued)

OTHER PUBLICATIONS

Screen shot of website dated May 2011: www.cbs.com/primtime/60_minutes/video/?pid=Hwiua1litcOuuHiAYN.
Chen, Yu, et al., "An Error Concealment Algorithm for Entire Frame Loss in Video Transmission," Picture Coding Symposium, 2004.
European Search Report for European Patent Application No. 08146463.1 dated Jun. 23, 2009.
Feng, Wu-chi; Rexford, Jennifer; "A Comparison of Bandwidth Smoothing Techniques for the Transmission of Prerecorded Compressed Video", Paper, 1992, 22 pages.

(Continued)

*Primary Examiner* — El Hadji Sall
(74) *Attorney, Agent, or Firm* — Young Basile Hanlon & McFarlane P.C.

(57) ABSTRACT

A method and apparatus for adjustable buffer remote access is provided. Adjustable buffer remote access may include generating, at a client device, a client display buffer request indicating a portion of a display area of an operating environment of a host device, transmitting the client display buffer request to the host device receiving a rendering of a representation of the portion of the display area of the host device, presenting a client display portion of the rendered buffer portion as a window into the display area of the operating environment of the host device, receiving an indication of a client display portion change presenting an updated client display portion based on the rendered buffer portion and the client display portion change, transmitting an updated client display buffer request to the host device, receiving an updated rendered buffer portion, and presenting the updated client display portion.

20 Claims, 7 Drawing Sheets

(56) References Cited

U.S. PATENT DOCUMENTS

| | | |
|---|---|---|
| D614,646 S | 4/2010 | Chen et al. |
| 7,707,224 B2 | 4/2010 | Chastagnol et al. |
| 7,710,973 B2 | 5/2010 | Rumbaugh et al. |
| 7,720,686 B2 | 5/2010 | Volk et al. |
| 7,735,111 B2 | 6/2010 | Michener et al. |
| 7,739,714 B2 | 6/2010 | Guedalia |
| 7,756,127 B2 | 7/2010 | Nagai et al. |
| 7,797,274 B2 | 9/2010 | Strathearn et al. |
| 7,822,607 B2 | 10/2010 | Aoki et al. |
| 7,823,039 B2 | 10/2010 | Park et al. |
| 7,860,718 B2 | 12/2010 | Lee et al. |
| 7,864,210 B2 | 1/2011 | Kennedy |
| 7,974,243 B2 | 7/2011 | Nagata et al. |
| 8,010,185 B2 | 8/2011 | Ueda |
| 8,019,175 B2 | 9/2011 | Lee et al. |
| 8,060,651 B2 | 11/2011 | Deshpande et al. |
| 8,078,493 B2 | 12/2011 | Rosenberg et al. |
| 8,085,767 B2 | 12/2011 | Lussier et al. |
| 8,087,056 B2 | 12/2011 | Ryu |
| 8,130,823 B2 | 3/2012 | Gordon et al. |
| 8,161,159 B1 | 4/2012 | Shetty et al. |
| 8,175,041 B2 | 5/2012 | Shao et al. |
| 8,176,524 B2 | 5/2012 | Singh et al. |
| 8,179,983 B2 | 5/2012 | Gordon et al. |
| 8,223,268 B2 | 7/2012 | Fujiwara et al. |
| 8,233,539 B2 | 7/2012 | Kwon |
| 8,265,450 B2 | 9/2012 | Black et al. |
| 8,307,403 B2 | 11/2012 | Bradstreet et al. |
| 8,316,450 B2 | 11/2012 | Robinson et al. |
| 8,494,053 B2 | 7/2013 | He et al. |
| 8,553,776 B2 | 10/2013 | Shi et al. |
| 2002/0085637 A1 | 7/2002 | Henning |
| 2002/0140851 A1 | 10/2002 | Laksono |
| 2002/0152318 A1 | 10/2002 | Menon et al. |
| 2002/0157058 A1 | 10/2002 | Ariel et al. |
| 2002/0176604 A1 | 11/2002 | Shekhar et al. |
| 2002/0191072 A1 | 12/2002 | Henrikson |
| 2003/0012287 A1 | 1/2003 | Katsavounidis et al. |
| 2003/0014674 A1* | 1/2003 | Huffman et al. ............ 713/300 |
| 2003/0016630 A1 | 1/2003 | Vega-Garcia et al. |
| 2003/0061368 A1 | 3/2003 | Chaddha |
| 2003/0098992 A1 | 5/2003 | Park et al. |
| 2003/0226094 A1 | 12/2003 | Fukushima et al. |
| 2003/0229822 A1 | 12/2003 | Kim et al. |
| 2003/0229900 A1 | 12/2003 | Reisman |
| 2004/0071170 A1 | 4/2004 | Fukuda |
| 2004/0105004 A1 | 6/2004 | Rui et al. |
| 2004/0165585 A1 | 8/2004 | Imura et al. |
| 2004/0172252 A1 | 9/2004 | Aoki et al. |
| 2004/0172255 A1 | 9/2004 | Aoki et al. |
| 2004/0184444 A1 | 9/2004 | Aimoto et al. |
| 2004/0196902 A1 | 10/2004 | Faroudja |
| 2004/0233938 A1 | 11/2004 | Yamauchi |
| 2005/0033635 A1 | 2/2005 | Jeon |
| 2005/0041150 A1 | 2/2005 | Gewickey et al. |
| 2005/0060229 A1 | 3/2005 | Riedl et al. |
| 2005/0060742 A1 | 3/2005 | Riedl et al. |
| 2005/0060745 A1 | 3/2005 | Riedl et al. |
| 2005/0071781 A1 | 3/2005 | Atkins |
| 2005/0076272 A1 | 4/2005 | Delmas et al. |
| 2005/0091508 A1 | 4/2005 | Lee et al. |
| 2005/0117653 A1 | 6/2005 | Sankaran |
| 2005/0125734 A1 | 6/2005 | Mohammed et al. |
| 2005/0154965 A1 | 7/2005 | Ichiki et al. |
| 2005/0157793 A1 | 7/2005 | Ha et al. |
| 2005/0180415 A1 | 8/2005 | Cheung et al. |
| 2005/0185715 A1 | 8/2005 | Karczewicz et al. |
| 2005/0220188 A1 | 10/2005 | Wang |
| 2005/0251856 A1 | 11/2005 | Araujo et al. |
| 2005/0259729 A1 | 11/2005 | Sun |
| 2006/0013310 A1 | 1/2006 | Lee et al. |
| 2006/0039470 A1 | 2/2006 | Kim et al. |
| 2006/0066717 A1 | 3/2006 | Miceli |
| 2006/0140584 A1 | 6/2006 | Ellis et al. |
| 2006/0146940 A1 | 7/2006 | Gomila et al. |
| 2006/0150055 A1 | 7/2006 | Quinard et al. |
| 2006/0153217 A1 | 7/2006 | Chu et al. |
| 2006/0195864 A1 | 8/2006 | New et al. |
| 2006/0215014 A1 | 9/2006 | Cohen et al. |
| 2006/0215752 A1 | 9/2006 | Lee et al. |
| 2006/0247927 A1 | 11/2006 | Robbins et al. |
| 2006/0248563 A1 | 11/2006 | Lee et al. |
| 2006/0282774 A1 | 12/2006 | Covell et al. |
| 2006/0291475 A1 | 12/2006 | Cohen |
| 2007/0011702 A1 | 1/2007 | Vaysman |
| 2007/0036354 A1 | 2/2007 | Wee et al. |
| 2007/0064094 A1 | 3/2007 | Potekhin et al. |
| 2007/0080971 A1 | 4/2007 | Sung |
| 2007/0081522 A1 | 4/2007 | Apelbaum |
| 2007/0081587 A1 | 4/2007 | Raveendran et al. |
| 2007/0097257 A1 | 5/2007 | El-Maleh et al. |
| 2007/0121100 A1 | 5/2007 | Divo |
| 2007/0124762 A1 | 5/2007 | Chickering et al. |
| 2007/0168824 A1 | 7/2007 | Fukushima et al. |
| 2007/0195893 A1 | 8/2007 | Kim et al. |
| 2007/0223529 A1 | 9/2007 | Lee et al. |
| 2007/0237226 A1 | 10/2007 | Regunathan et al. |
| 2007/0237232 A1 | 10/2007 | Chang et al. |
| 2007/0250754 A1 | 10/2007 | Costa et al. |
| 2007/0268964 A1 | 11/2007 | Zhao |
| 2007/0285505 A1 | 12/2007 | Korneliussen |
| 2008/0004731 A1 | 1/2008 | Ozaki |
| 2008/0037624 A1 | 2/2008 | Walker et al. |
| 2008/0043832 A1 | 2/2008 | Barkley et al. |
| 2008/0052630 A1 | 2/2008 | Rosenbaum et al. |
| 2008/0072267 A1 | 3/2008 | Monta et al. |
| 2008/0077264 A1 | 3/2008 | Irvin et al. |
| 2008/0089414 A1 | 4/2008 | Wang et al. |
| 2008/0101403 A1 | 5/2008 | Michel et al. |
| 2008/0109369 A1 | 5/2008 | Su et al. |
| 2008/0109707 A1 | 5/2008 | Dell et al. |
| 2008/0126278 A1 | 5/2008 | Bronstein et al. |
| 2008/0134005 A1 | 6/2008 | Izzat et al. |
| 2008/0144553 A1 | 6/2008 | Shao et al. |
| 2008/0178211 A1 | 7/2008 | Lillo et al. |
| 2008/0207182 A1 | 8/2008 | Maharajh et al. |
| 2008/0209300 A1 | 8/2008 | Fukushima et al. |
| 2008/0250294 A1 | 10/2008 | Ngo et al. |
| 2008/0260042 A1 | 10/2008 | Shah et al. |
| 2008/0270528 A1 | 10/2008 | Girardeau et al. |
| 2008/0273591 A1 | 11/2008 | Brooks et al. |
| 2008/0320512 A1 | 12/2008 | Knight |
| 2009/0006927 A1 | 1/2009 | Sayadi et al. |
| 2009/0007159 A1 | 1/2009 | Rangarajan et al. |
| 2009/0010325 A1 | 1/2009 | Nie et al. |
| 2009/0013086 A1 | 1/2009 | Greenbaum |
| 2009/0022157 A1 | 1/2009 | Rumbaugh et al. |
| 2009/0031390 A1 | 1/2009 | Rajakarunanayake et al. |
| 2009/0059067 A1 | 3/2009 | Takanohashi et al. |
| 2009/0059917 A1 | 3/2009 | Lussier et al. |
| 2009/0080510 A1 | 3/2009 | Wiegand et al. |
| 2009/0103635 A1 | 4/2009 | Pahalawatta |
| 2009/0122867 A1 | 5/2009 | Mauchly et al. |
| 2009/0125812 A1 | 5/2009 | Blinnikka et al. |
| 2009/0138784 A1 | 5/2009 | Tamura et al. |
| 2009/0144417 A1 | 6/2009 | Kisel et al. |
| 2009/0161763 A1 | 6/2009 | Rossignol et al. |
| 2009/0180537 A1 | 7/2009 | Park et al. |
| 2009/0187862 A1 | 7/2009 | DaCosta |
| 2009/0238277 A1 | 9/2009 | Meehan |
| 2009/0241147 A1 | 9/2009 | Kim et al. |
| 2009/0245351 A1 | 10/2009 | Watanabe |
| 2009/0249158 A1 | 10/2009 | Noh et al. |
| 2009/0254657 A1 | 10/2009 | Melnyk et al. |
| 2009/0268819 A1 | 10/2009 | Nishida |
| 2009/0276686 A1 | 11/2009 | Liu et al. |
| 2009/0276817 A1 | 11/2009 | Colter et al. |
| 2009/0307227 A1 | 12/2009 | Prestenback et al. |
| 2009/0322854 A1 | 12/2009 | Ellner |
| 2010/0040349 A1 | 2/2010 | Landy |
| 2010/0054333 A1 | 3/2010 | Bing et al. |
| 2010/0077058 A1 | 3/2010 | Messer |
| 2010/0122127 A1 | 5/2010 | Oliva et al. |
| 2010/0149301 A1 | 6/2010 | Lee et al. |

(56) References Cited

U.S. PATENT DOCUMENTS

| | | |
|---|---|---|
| 2010/0153828 A1 | 6/2010 | De Lind Van Wijngaarden et al. |
| 2010/0171882 A1 | 7/2010 | Cho et al. |
| 2010/0186041 A1 | 7/2010 | Chu et al. |
| 2010/0192078 A1 | 7/2010 | Hwang et al. |
| 2010/0202414 A1 | 8/2010 | Malladi et al. |
| 2010/0220172 A1 | 9/2010 | Michaelis |
| 2010/0235820 A1 | 9/2010 | Khouzam et al. |
| 2010/0293470 A1 | 11/2010 | Zhao et al. |
| 2010/0306618 A1 | 12/2010 | Kim et al. |
| 2010/0309372 A1 | 12/2010 | Zhong |
| 2010/0309982 A1 | 12/2010 | Le Floch et al. |
| 2011/0033125 A1 | 2/2011 | Shiraishi |
| 2011/0047163 A1 | 2/2011 | Chechik et al. |
| 2011/0069890 A1 | 3/2011 | Besley |
| 2011/0093273 A1 | 4/2011 | Lee et al. |
| 2011/0103480 A1 | 5/2011 | Dane |
| 2011/0131144 A1 | 6/2011 | Ashour et al. |
| 2011/0158529 A1 | 6/2011 | Malik |
| 2011/0191374 A1 | 8/2011 | Bengio et al. |
| 2011/0194605 A1 | 8/2011 | Amon et al. |
| 2011/0218439 A1 | 9/2011 | Masui et al. |
| 2011/0225417 A1 | 9/2011 | Maharajh et al. |
| 2011/0265136 A1 | 10/2011 | Liwerant et al. |
| 2012/0013705 A1 | 1/2012 | Taylor et al. |
| 2012/0072960 A1 | 3/2012 | Rosenberg et al. |
| 2012/0084821 A1 | 4/2012 | Rogers |
| 2012/0110443 A1 | 5/2012 | Lemonik et al. |
| 2012/0206562 A1 | 8/2012 | Yang et al. |
| 2012/0232681 A1 | 9/2012 | Mundy et al. |
| 2012/0246343 A1 | 9/2012 | Story, Jr. et al. |
| 2012/0287999 A1 | 11/2012 | Li et al. |
| 2012/0315008 A1 | 12/2012 | Dixon et al. |
| 2012/0324324 A1 | 12/2012 | Hwang et al. |
| 2013/0031441 A1 | 1/2013 | Ngo et al. |
| 2013/0198617 A1 | 8/2013 | Maloney et al. |

FOREIGN PATENT DOCUMENTS

| | | |
|---|---|---|
| JP | 2008146057 | 6/2008 |
| JP | 2008225379 | 9/2008 |
| WO | WO0249356 | 6/2002 |
| WO | WO2007057850 | 5/2007 |
| WO | WO2008006062 | 1/2008 |

OTHER PUBLICATIONS

Friedman, et al., "RTP: Control Protocol Extended Reports (RTPC XR)," Network Working Group RFC 3611 (The Internet Society 2003) (52 pp).
Frossard, Pascal; "Joint Source/FEC Rate Selection for Quality-Optimal MPEG-2 Video Delivery", IEEE Transactions on Image Processing, vol. 10, No. 12, (Dec. 2001) pp. 1815-1825.
Hartikainen, E. and Ekelin, S. Tuning the Temporal Characteristics of a Kalman-Filter Method for End-to-End Bandwidth Estimation. IEEE E2EMON. Apr. 3, 2006.
High efficiency video coding (HEVC) text specification draft 6, JCTVC-H1003, JCT-VC 7th meeting, Geneva, Switzerland, Nov. 21-30, 2011.
International Search Report and Written Opinion Dated Aug. 13, 2012, in PCT/US2012/034426.
International Search Report and Written Opinion for International Application No. PCT/US2011/051818 dated Nov. 21, 2011 (16 pages).
International Search Report for International Application No. PCT/EP2009/057252 mailed on Aug. 27, 2009.
JongWon Kim, Young-Gook Kim, HwangJun Song, Tien-Ying Kuo, Yon Jun Chung, and C.-C. Jay Kuo; "TCP-friendly Internet Video Streaming employing Variable Frame-rate Encoding and Interpolation"; IEEE Trans. Circuits Syst. Video Technology, Jan. 2000; vol. 10 pp. 1164-1177.
Khronos Group Inc. OpenMAX Integration Layer Application Programming Interface Specification. Dec. 16, 2005, 326 pages, Version 1.0.
Korhonen, Jari; Frossard, Pascal; "Flexible forward error correction codes with application to partial media data recovery", Signal Processing: Image Communication vol. 24, No. 3 (Mar. 2009) pp. 229-242.
Li, A., "RTP Payload Format for Generic Forward Error Correction", Network Working Group, Standards Track, Dec. 2007, (45 pp).
Liang, Y.J.; Apostolopoulos, J.G.; Girod, B., "Analysis of packet loss for compressed video: does burst-length matter?," Acoustics, Speech and Signal Processing, 2003. Proceedings. (ICASSP '03). 2003 IEEE International conference on, vol. 5, No., pp. V, 684-7 vol. 5, Apr. 6-10, 2003.
Murat A. Tekalp, 'Block-Based Methods, Digital Video Processing, Prentice Hall Processing Series, Aug. 12, 1995, pp. 98-116, Prentice Hall PTR.
Neogi, A., et al., Compression Techniques for Active Video Content; State University of New York at Stony Brook; Computer Science Department; pp. 1-11.
ON2 Technologies Inc., White Paper TrueMotion VP7 Video Codec, Jan. 10, 2005, 13 pages, Document Version: 1.0, Clifton Park, New York.
ON2 Technologies, Inc., White Paper On2's TrueMotion VP7 Video Codec, Jul. 11, 2008, pp. 7 pages, Document Version:1.0, Clifton Park, New York.
Park, Jun Sung, et al., "Selective Intra Prediction Mode Decision for H.264/AVC Encoders", World Academy of Science, Engineering and Technology 13, (2006).
Peng, Qiang, et al., "Block-Based Temporal Error Concealment for Video Packet Using Motion Vector Extrapolation," IEEE 2003 Conference of Communications, Circuits and Systems and West Sino Expositions, vol. 1, No. 29, pp. 10-14 (IEEE 2002).
Roca, Vincent, et al., Design and Evaluation of a Low Density Generator Matrix (LDGM) Large Block FEC Codec, INRIA Rhone-Alpes, Planete project, France, Date Unknown, (12 pp).
"Rosenberg, J. D. RTCWEB I-D with thoughts on the framework. Feb. 8, 2011. Retrieved fromhttp://www.ietf.org/mail-archive/web/dispatch/current/msg03383.html on Aug. 1, 2011.".
"Rosenberg, J.D., et al. An Architectural Framework for Browser based Real-Time Communications (RTC) draft-rosenberg-rtcweb-framework-00. Feb. 8, 2011. Retrieved fromhttp://www.ietf.org/id/draft-rosenberg-rtcweb-framework-00.txt on Aug. 1, 2011.".
Scalable Video Coding, SVC, Annex G extension of H264.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wikipedia, the free encyclopedia, "Low-density parity-check code", http://en.wikipedia.org/wiki/Low-density_parity-check_code, Jul. 30, 2012 (5 pp).
Yan, Bo and Gharavi, Hamid, "A Hybrid Frame Concealment Algorithm for H.264/AVC," IEEE Transactions on Image Processing, vol. 19, No. 1, pp. 98-107 (IEEE, Jan. 2010).
Yoo, S. J.B., "Optical Packet and burst Switching Technologies for the Future Photonic Internet," Lightwave Technology, Journal of, vol. 24, No. 12, pp. 4468, 4492, Dec. 2006.
Yu, Xunqi, et al; "The Accuracy of Markov Chain Models in Predicting Packet-Loss Statistics for a Single Multiplexer", IEEE Transaactions on Information Theory, vol. 54, No. 1 (Jan. 2008) pp. 489-501.
"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Sup-

(56) References Cited

OTHER PUBLICATIONS port of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, an Open Source Video Codec for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
Chae-Eun Rhee et al. (:A Real-Time H.264/AVC Encoder with Complexity-Aware Time Allocation, Circuits and Systems for video Technology, IEEE Transactions on, vol. 20, No. 12, pp. 1848, 1862, Dec. 2010).
Ciachetti (Matching techniques to compute image motion, Image and Vision Computing, vol. 18, No. 3, Feb. 2000, pp. 247-260.
Sceen shot of website dated Oct. 14, 2011: www:abc.go.com/watch/2020/SH559026/VD55148316/2020.
Screen shot of website dated May, 2011: www.cbs.com/primtime/60_minutes/video/?pid=Hwiua1litcOuuHiAYN.

\* cited by examiner

ADJUSTABLE BUFFER REMOTE ACCESS

TECHNICAL FIELD

This application relates to computer implemented applications.

BACKGROUND

A computing device may execute an operating environment that may include elements, such as file system objects and executing applications. The computing device may render a representation of the operating environment as part of a graphical interface, which may be output for presentation on a display unit of the computing device. The representation of the operating environment may be rendered at a defined display resolution, which may define a display area included in the graphical interface.

SUMMARY

Disclosed herein are aspects of systems, methods, and apparatuses for adjustable buffer remote access.

An aspect is a method for adjustable buffer remote access. Adjustable buffer remote access may include generating, at a client device, a client display buffer request indicating a portion of a display area of an operating environment of a host device; transmitting the client display buffer request to the host device; receiving a rendered buffer portion including a rendering of a representation of the portion of the display area of the operating environment of the host device, wherein the rendered buffer portion includes a client display portion and a margin portion; presenting the client display portion as a window into the display area of the operating environment of the host device.

Another aspect is another method for adjustable buffer remote access. Adjustable buffer remote access may include initiating an adjustable buffer remote access session, wherein initiating the adjustable buffer remote access session includes receiving host display information indicating the display area, generating, at a client device, a client display buffer request indicating a portion of a display area of an operating environment of a host device, and transmitting the client display buffer request to the host device via an electronic communication network. The method of adjustable buffer remote access may include receiving, via the electronic communication network, a rendered buffer portion including a rendering of a representation of the portion of the display area of the operating environment of the host device, wherein the rendered buffer portion includes a client display portion and a margin portion; identifying the client display portion based on a difference between the rendered buffer portion and the margin portion; and presenting the client display portion as a window into the display area of the operating environment of the host device by outputting a portion of the rendered buffer portion corresponding to the client display portion to a graphical display device of the client device.

Another aspect is another method for adjustable buffer remote access. Adjustable buffer remote access may include initiating an adjustable buffer remote access session, wherein initiating the adjustable buffer remote access session includes receiving host display information indicating the display area, generating, at a client device, a client display buffer request indicating a portion of a display area of an operating environment of a host device, and transmitting the client display buffer request to the host device via an electronic communication network. The method of adjustable buffer remote access may include receiving, via the electronic communication network, a rendered buffer portion including a rendering of a representation of the portion of the display area of the operating environment of the host device, wherein the rendered buffer portion includes a client display portion and a margin portion; presenting the client display portion as a window into the display area of the operating environment of the host device by outputting a portion of the rendered buffer portion corresponding to the client display portion to a graphical display device of the client device; receiving an indication of a client display portion change from a user input device of the client device via an operating system of the client device, wherein the client display portion change indicates a change in position, size, or zoom of the client display portion relative to the representation of the display area of the operating environment of the host device; presenting an updated client display portion based on the rendered buffer portion and the client display portion change, wherein the updated client display portion includes a portion of the margin portion; transmitting an updated client display buffer request to the host device indicating an updated portion of the display area of the operating environment of the host device based on the client display portion change; receiving an updated rendered buffer portion including a rendering of a representation of the updated portion of the display area of the operating environment of the host device, wherein the updated rendered buffer portion includes the updated client display portion and an updated margin portion; and presenting the updated client display portion.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Remote access technologies, such as remote desktop or screen sharing, may allow a computing device (client) to remotely access an operating environment of another computing device (host). For example, the host device may render a representation of a display area of the operating environment, which may be associated with a defined resolution, and may transmit the rendered output to the client device for presentation on a display unit of the client device. Rendering the representation of the display area may include, for example, capturing the content of the display area and encoding the content as a series of frames.

In moving window based remote access technologies, the host device may render a representation of a portion of the display area of operating environment on the host device and may transmit the output, including the rendered portion of the display area, to the client device. The client device may present the output as a window into the display area of the operating environment. The window may be moved to include another portion of the display area, and the host device may render the other portion of the display area and transmit the output to the client device for presentation.

In some implementations, moving window based remote access technologies may perform poorly at the client device due to the time utilized between input of a change in window position at the client device and receipt, at the client device, of the output rendered by the host device. For example, changing the portion displayed may include transmitting information indicating the new the portion of the display area from the client device to the host device, which may include a size of the portion, rendering the new portion of the display area at the host device, transmitting the output from the host device to the client device, and presenting the rendering of the new portion at the display unit of the client device.

Adjustable buffer remote access may improve remote access performance, and may include transmitting information indicating the a buffer portion of the display area from the client device to the host device, rendering the buffer portion of the display area at the host device, transmitting the output from the host device to the client device, and presenting the a display portion of the rendered buffer portion at the display unit of the client device, wherein the display portion is smaller than and included within the buffer portion.

Figure 1:
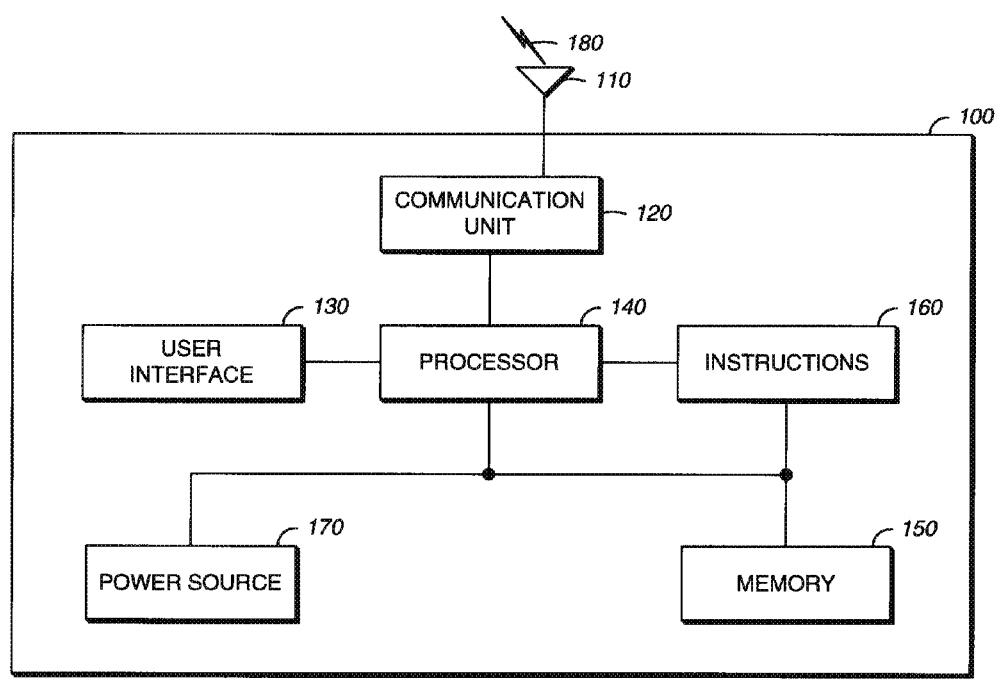
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
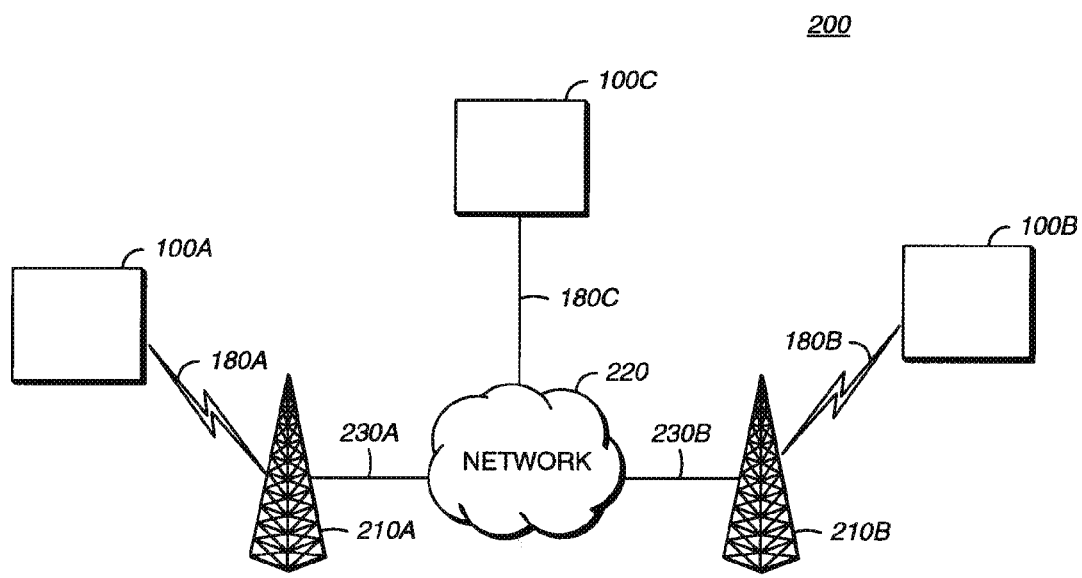
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
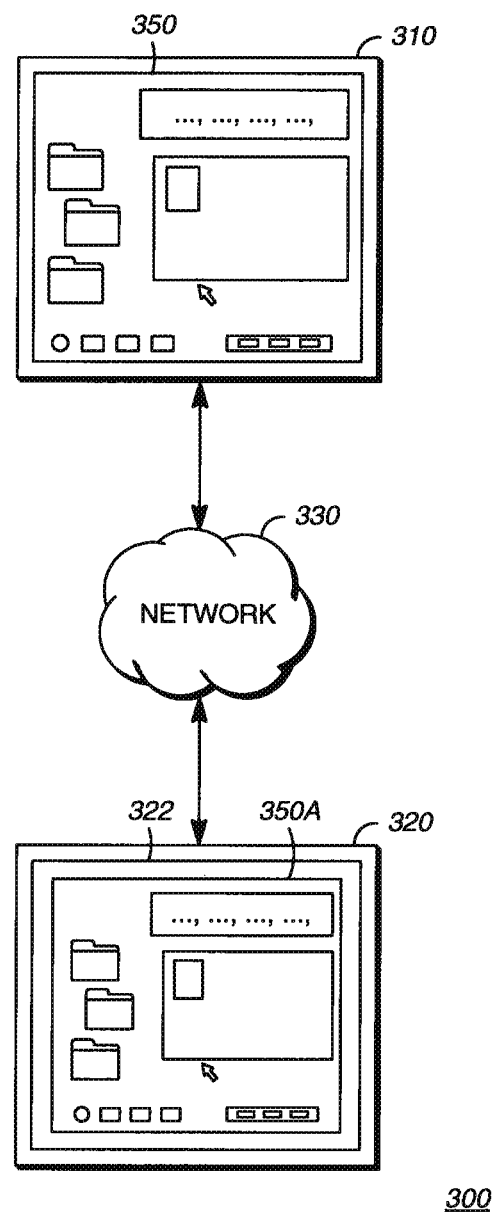
FIG. 3 is a diagram of remote access in accordance with implementations of this disclosure.

FIG. 3 is a diagram of remote access in accordance with implementations of this disclosure. Remote access may include a host device 310, which may be a computing device, such as the computing device 100 shown in FIG. 1 or the computing and communication devices 100A/100B/100C shown in FIG. 2, communicating with a client device 320, which may be may be a computing device, such as the computing device 100 shown in FIG. 1 or computing and communication device 100A/100B/100C shown in FIG. 2, via a network 330, such as the network 220 shown in FIG. 2.

The host device 310 may execute an operating environment, which may include an instance of an operating system and may be associated with an account, such as a logged in user account. As shown, a representation of the operating environment may include a display area 350. The display area 350 may indicate a height and a width of the representation of the operating environment. For example, the display area 350 may be associated with a defined display resolution, which may be expressed in physical units of measure, such as millimeters, or logical units of measure, such as pixels. For example, the display area 350 may have a display resolution of 1920 (width) by 1080 (height) pixels. The host device 310 may render the display area and may transmit the rendered output to the client device 320 via the network 330. In some implementations, the host device 310 may render the output as a series of frames, which may include an I-frame followed by one or more P-frames.

The client device 320 may execute an operating environment, which may include a remote access application 322. The client device 320 may receive the rendered output from the host device 310 via the network 330 and may present the representation of the display area 350A via a graphical display unit of the client device 320.

In some implementations, the client device 320 may be configured to present the representation of the display area 350A at a display resolution that differs from the display resolution rendered by the host device 310. For example, the client device 320 may scale the rendered output for presentation via the graphical display unit of the client device 320. In some implementations, the host device 310 may receive an indication of the display resolution of the client device 320 and may render the representation of the operating environment using the display resolution of the client device 320.

For example, the host device 310 may adjust the display resolution of the host device 310 to match the display resolution of the client device 320, and may render the representation of the display area at the adjusted display resolution. Adjusting the display resolution may cause unwanted interference with the operating environment of the host device 310.

In another example, rendering the representation of the display are at the host device 310 may include scaling or sampling the representation of the display area to generate output at the display resolution of the client device 320, which may consume significant resources, such as processing resources, and may produce graphical artifacts.

Figure 4:
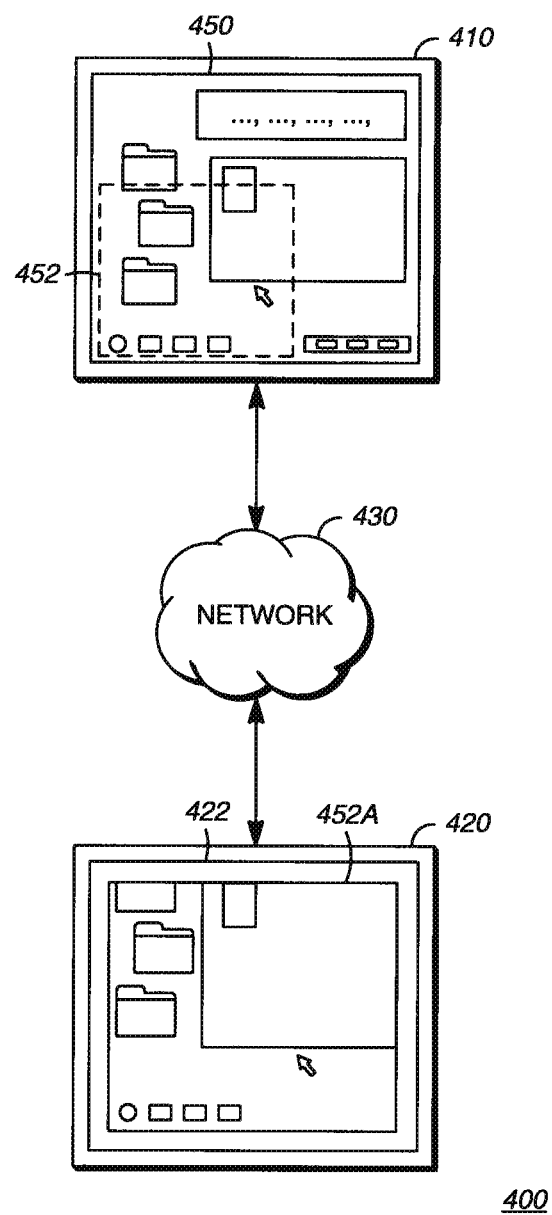
FIG. 4 is a diagram of movable window based remote access in accordance with implementations of this disclosure.

FIG. 4 is a diagram of movable window based remote access in accordance with implementations of this disclosure. Movable window based remote access may include a host device 410, which may be a computing device, such as the computing device 100 shown in FIG. 1 or the computing and communication devices 100A/100B/100C shown in FIG. 2, communicating with a client device 420, which may be may be a computing device, such as the computing device 100 shown in FIG. 1 or computing and communication device 100A/100B/100C shown in FIG. 2, via a network 430, such as the network 220 shown in FIG. 2.

The host device 410 may execute an operating environment, which may include an instance of an operating system and may be associated with an account, such as a logged in user account. As shown, a representation of the operating environment may include a display area 450. The host device 410 may receive an indication of a display window 452, which may include a display resolution and position, from the client device 420. The host device 410 may render a representation of a portion of the display area indicated by the window 452, and may transmit the rendered output to the client device 420 via the network 430.

Although any size and position scheme may be used, display resolution and position are described herein using pixel count and Cartesian coordinates such that the display resolution of the display area 450 may be expressed as a number of horizontal pixels and a number of vertical pixels, such as 1920×1080, a pixel at the top left corner of the display area 450 may be indicated by the coordinates 0/0, and a pixel at the bottom right corner of the display area 450 may be indicated by the coordinates 1920/1080.

For example, the display area 450 of the host device 410 may be expressed as a width, which may be a number of horizontal pixels, such as host_width=1920, and a height, which may be a number of vertical pixels, such as host_height=1080, and the display window 452 may be expressed as a width, which may be a number of horizontal pixels, such as client_width=1024, a height, which may be a number of vertical pixels, such as client_height=800, and a position, which may indicate, for example, the position of the top left corner of the display window 452 relative to the display area 450. The position may include a horizontal offset, which may be a number of pixels from the left side of the display area 450, such as offset_x=10, and a vertical offset, which may be a number of pixels from the top of the display area 450, such as offset_y=280.

The client device 420 may execute an operating environment, which may include a remote access application 422. The client device 420 may receive the rendered output from the host device 410 via the network 430 and may present the representation of the portion of the display area 452A via a graphical display unit of the client device 420.

Although not shown in FIG. 4, the position, size, zoom, or a combination thereof, of the display window 452A may be updated at the client device 420. The updated display window information may be transmitted to the host device 410. The host device 410 may render a representation of a new portion of the display area based on the updated window information, and may transmit the rendered output to the client device 420 via the network 430. The client device 420 may receive the rendered output from the host device 410 via the network 430 and may present the representation of the new portion of the display area 452A via a graphical display unit of the client device 420.

In some implementations, changing the position, size, or zoom of the display window 452A may perform poorly at the client device 420. For example, the client device 420 may send updated display window position information, such as a new offset, to the host device 410. The host device 410 may process the updated display window information, may render a representation of the updated portion of the display area 450 corresponding to the updated display window information as a series of frames including an I-frame followed by one or more P-frames, and may send the series of frames to the client device 420. The client device 420 may receive one or more of the series of frames, such as the I-frame, and may begin presenting the representation of the updated portion of the display area. The I-frame may take longer to render and transmit than a P-frame. The delay between sending the updated information and receiving the rendered output corresponding to the new offset may be noticeable, such as hundreds of milliseconds.

Figure 5:
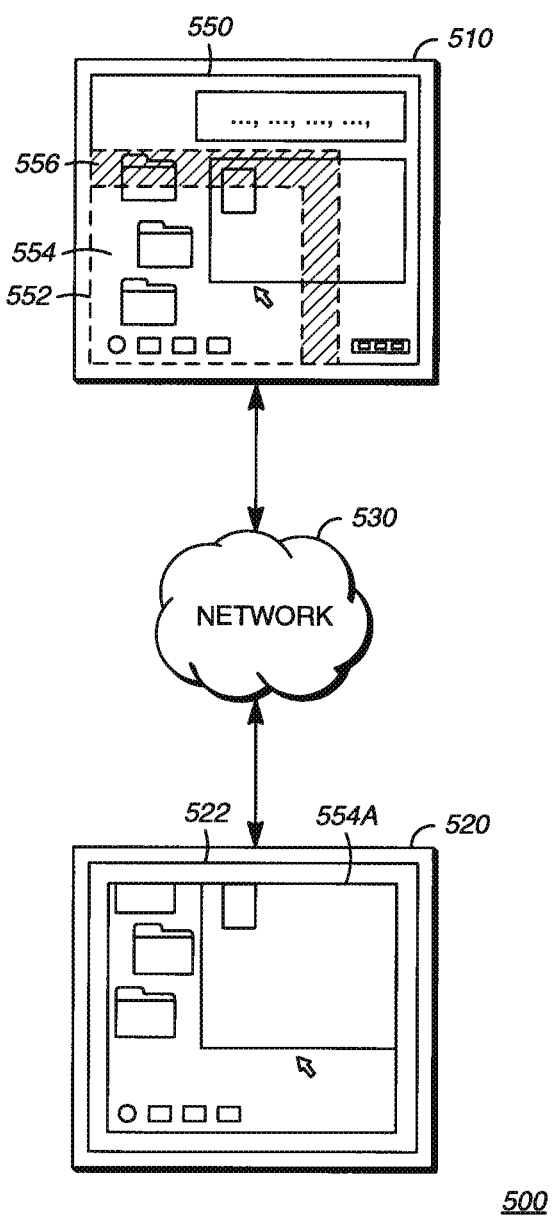
FIG. 5 is a diagram of adjustable buffer remote access in accordance with implementations of this disclosure.

FIG. 5 is a diagram of adjustable buffer remote access in accordance with implementations of this disclosure. Adjustable buffer remote access may include a host device 510, which may be a computing device, such as the computing device 100 shown in FIG. 1 or the computing and communication devices 100A/100B/100C shown in FIG. 2, communicating with a client device 520, which may be may be a computing device, such as the computing device 100 shown in FIG. 1 or computing and communication device 100A/100B/100C shown in FIG. 2, via a network 530, such as the network 220 shown in FIG. 2.

The host device 510 may execute an operating environment, which may include an instance of an operating system and may be associated with an account, such as a logged in user account. As shown, a representation of the operating environment may include a display area 550. The host device 510 may receive an indication of a display window buffer 552, which may include a display resolution and position, from the client device 520. The display window buffer 552 may include a display window portion 554 and a margin portion 556. The host device 510 may render a representation of a portion of the display area 550 indicated by the display window buffer 552, and may transmit the rendered output to the client device 520 via the network 530. In some implementations, the host device 510 may not include a graphical display device. Although described as two dimensional herein, the display area 550 may be three dimensional.

The client device 520 may execute an operating environment, which may include a remote access application 522. The client device 520 may receive the rendered output from the host device 510, which may include the display window portion 554 and the margin portion 556, via the network 530 and may present a portion 554A of the representation of the portion of the display area indicated by the display window buffer 552 via a graphical display unit of the client device 520. The presented portion 554A may correspond to the display window portion 554, and the margin portion 556 may not be presented.

Although not shown in FIG. 5, the position, size, zoom, or a combination thereof, of the display window portion 554A may be updated at the client device 520. The updated display window portion 554A may be included, in whole or in part, in the display window buffer 552 and the client device 520 may present the representation of the updated display window portion included in the window buffer 552. Updated display window buffer information may be transmitted to the host device 510. The host device 510 may render a representation of a new portion of the display area based on the updated display window buffer information, and may transmit the rendered output to the client device 520 via the network 530. The client device 520 may receive the rendered output from the host device 510 via the network 530 and may present the representation of the new portion of the display area 554A via a graphical display unit of the client device 520.

Figure 6:
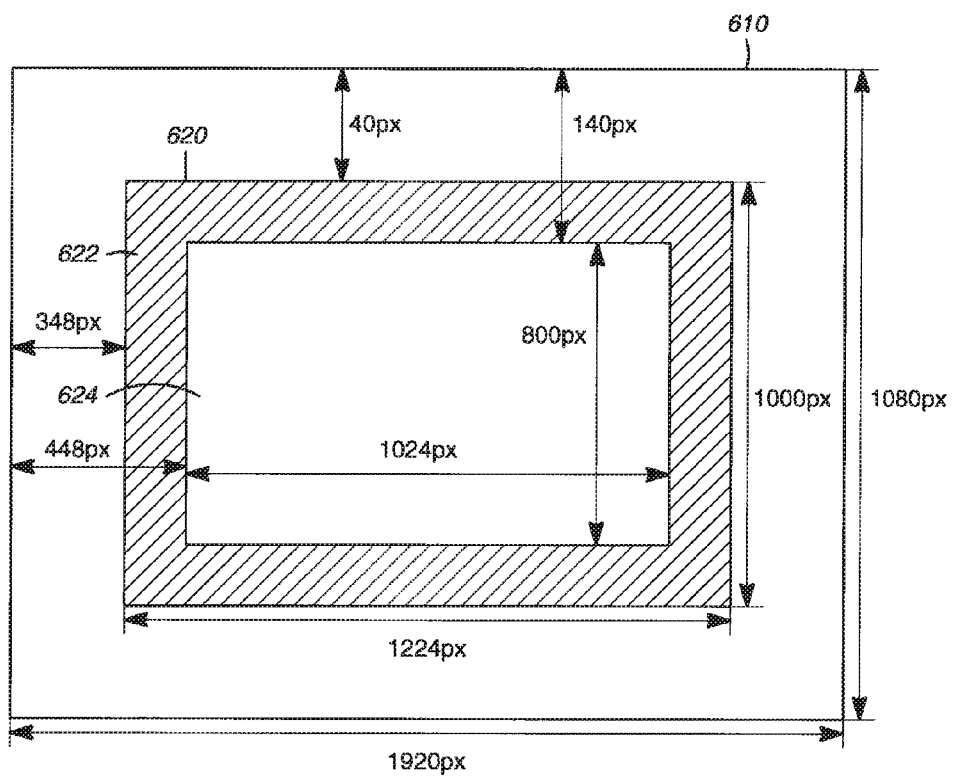
FIG. 6 is a diagram of an adjustable buffer remote access display area in accordance with implementations of this disclosure.

FIG. 6 is a diagram of an adjustable buffer remote access display area in accordance with implementations of this disclosure. A host device, such as the host device 510 shown in FIG. 5, may execute an operating environment and may perform adjustable buffer remote access. FIG. 6 shows a display area 610 of the operating environment on the host device. The display area 610 includes a display buffer 620, which includes a margin portion 622 and a client display portion 624.

The display area 610 may indicate a height and a width of a representation of the operating environment at the host device. For example, the display area 610 may be expressed as a width, which may be a number of horizontal pixels, such as host_width=1920, and a height, which may be a number of vertical pixels, such as host_height=1080.

The client display portion 624 may indicate a height and width of a display window on a client device, such as the client device 520 shown in FIG. 5. For example, the client display portion 624 may be expressed as a width, which may be a number of horizontal pixels, such as client_display_width=1024, a height, which may be a number of vertical pixels, such as client_display_height=800. The position of the client display portion 624 relative to the display area 610 may be expressed as an offset, which may indicate a position of the top left pixel of the client display portion 624 relative to the top left pixel of the display area 610, and may include a horizontal offset, and a vertical offset. The horizontal offset may indicate a logical or physical distance, such as a number of horizontal pixels, from the left side of the display area 610 to the left side of the client display portion 624, and may be expressed as display_offset_x. The vertical offset may indicate a logical or physical distance, such as a number of vertical pixels, from the top of the display area 610 to the top of the client display portion 624, and may be expressed as display_offset_y.

The display buffer 620 may indicate a height and width of a portion of the display area of the host device, such as a portion requested by a client device. For example, the display buffer 620 may be expressed as a width, which may be a number of horizontal pixels, such as client_buffer_width=1224, a height, which may be a number of vertical pixels, such as client_buffer_height=1000. The position of the display buffer 620 relative to the display area 610 may be expressed as an offset, which may indicate a position of the top left pixel of the display buffer 620 relative to the top left pixel of the display area 610, and may include a horizontal offset, and a vertical offset. The horizontal offset may indicate a logical or physical distance, such as a number of horizontal pixels, from the left side of the display area 610 to the left side of the display buffer 620, and may be expressed as buffer_offset_x. The vertical offset may indicate a logical or physical distance, such as a number of vertical pixels, from the top of the display area 610 to the top of the display buffer 620, and may be expressed as buffer_offset_y. The margin portion 622 may indicate a difference between the client display portion 624 and the display buffer 620.

As shown, the display area 610 may be larger than the display buffer 620 and the display buffer 620 may be larger than the client display portion 624, which may be expressed as follows:

display_end_x=display_offset_x+client_display_width−1;
display_end_y=display offset_y+client_display_height−1;
buffer_end_x=buffer_offset_x+client_buffer_width−1;
buffer_end_y=buffer_offset_y+client_buffer_height−1;
display_offset_x>=buffer_offset_x;
display_offset_x<=buffer_end_x;
display_offset_y>=buffer_offset_y;
display_offset_y<=buffer_end_y;
display_end_x>=buffer_offset_x;
display_end_x<=buffer_end_x;
display_end_y>=buffer_offset_y;
display_end_y<=buffer_end_y.

In some implementations, the margin portion 622 may be dynamically adjustable. For example, a client device may determine the relative size of the margin portion and may minimize presentation disruption. In an example, the margin portion 622 use a constant margin size (margin_left, margin_right, margin_top, margin_bottom), which may be expressed as the following:

client_buffer_width=client_display_width+margin_left+margin_right;
client_buffer_height=client_display_height+margin_top+margin_bottom.

In another example, the margin portion 622 may use a constant margin size ratio (ratio_left, ratio_right, ratio_top, ratio_bottom), which may be expressed as the following:

client_buffer_width=client_display_width*(1+ratio_left+ratio_right)

client_buffer_height=client_display_height*(1+ratio_top+ratio_bottom)

Figure 7:
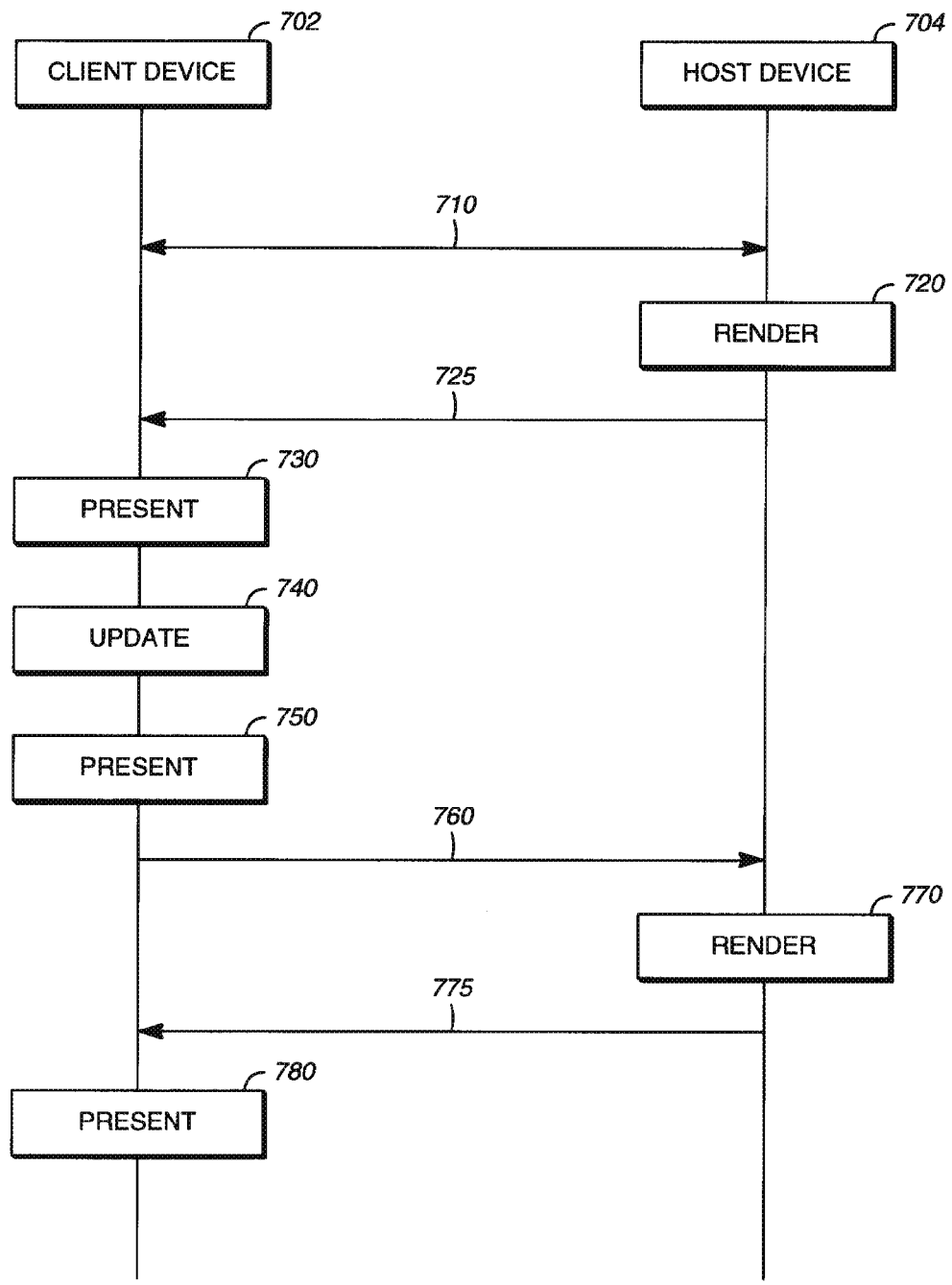
FIG. 7 is a diagram of an adjustable buffer remote access process flow in accordance with implementations of this disclosure.

FIG. 7 is a diagram of an adjustable buffer remote access process flow in accordance with implementations of this disclosure. Adjustable buffer remote access may include a client device 702, which may be a computing device, such as the computing device 100 shown in FIG. 1 or the computing and communication devices 100A/100B/100C shown in FIG. 2, communicating with a host device 704, which may be may be a computing device, such as the computing device 100 shown in FIG. 1 or computing and communication device 100A/100B/100C shown in FIG. 2, via a network, such as the network 220 shown in FIG. 2.

Adjustable buffer remote access, such as the adjustable buffer remote access shown in FIG. 5, may include initiating remote access at 710, rendering a buffer portion at 720, transmitting the rendered buffer portion to the client device at 725, presenting a display portion at 730, receiving a display portion update by the client device at 740, presenting the updated display portion at 750, transmitting a buffer update to the host device at 760, rendering the updated buffer portion at 770, transmitting the rendered updated buffer portion to the client device at 775, re-presenting the updated display portion at 780, or a combination thereof.

Adjustable buffer remote access may be initiated at 710. Initiating adjustable buffer remote access may include establishing a connection between the client device 702 and the host device 704. The client device 702 and the host device 704 may exchange information, such as a client display buffer request, a request identifier (request_id), a requested display buffer size (client_buffer_width, client_buffer_height) and position (buffer_offset_x, buffer_offset_y) and a display resolution (host_width, host_height) of the host device 704. The exchanged information may indicate that the client device 702 is using moving window based remote access or adjustable buffer remote access. In some implementations, the client device 702 may determine whether the requested buffer is within the host 704 display area.

The host device 704 may render a portion of a representation of a display area of an operating environment of the host device 704 at 720. The portion rendered may correspond to the requested display buffer information, as shown in FIG. 6. For example, the host device 704 may render a sequence of frames. Each frame may include implicit or explicit information, such as the request identifier, offset information, buffer information, a timestamp, or any other information relevant to the rendered sequence of frames.

The host device 704 may transmit and the client device 702 may receive the rendered buffer portion at 725. The rendered buffer portion may include a portion corresponding to the client display portion, as shown in FIG. 6, and the client device 702 may present the client display portion as a window into the display area of the host operating environment at 730. For example, the client device 702 may present the client display portion via a local graphical display device.

The client device 702 may receive an indication of a change of the client display portion at 740. For example, the client device 702 may receive input, such as user input, which may be received, via an operating system of the client device, from a user input device of the client device, such as a mouse, a keyboard, or a touch screen, indicating a change in the size, position, zoom, or a combination thereof, of the client display portion. For example, the client device 702 may include a touch screen and the indication of the change of the client display portion may be received in response to a gesture received by the touch screen.

The client device 702 my present the updated display portion, or a part of the updated display portion, based on the received rendered buffer portion at 750.

In some implementations, the updated client display portion may be included in the received rendered buffer portion. For example, the client display portion change may be smaller than the difference between the client display portion and the buffer portion. As shown in FIG. 6, for example, the buffer display portion may include 100 pixels to the left of the display portion and the change of the client display portion may indicate a movement of the window by 50 pixels to the left. The client device may present the updated client display portion using the information included in the received rendered buffer portion.

In some implementations, the updated client display portion, or portion thereof, may not be included in the received rendered buffer portion. For example, the client display portion change may be larger than the difference between the client display portion and the buffer portion. The client device 702 may present the portion of the updated client display portion that is included in the received rendered buffer portion.

The client device 702 may transmit information indicating the display portion update to the host device 704 at 760. For example, the client device 702 may transmit a new request identifier (request_id), a new requested display buffer size (client_buffet_width, client_buffer_height), and a new requested buffer position (buffer_offset_x, buffer_offset_y). Although shown sequentially in FIG. 7, the client device 702 may present the updated display portion and transmit the updated display portion information in any order or concurrently.

The host device 704 may render a portion of a representation of a display area of an operating environment corresponding to the updated buffer information at 770. The host device 704 may transmit and the client device 702 may receive the updated rendered buffer portion at 775. The client device 702 may present the updated display portion based on the received updated rendered buffer portion at 780.

Although described with reference to an operating environment of the host device 704, adjustable buffer remote access may be used for remote presentation at the client device 702 of any content rendered at the host device 704. For example, adjustable buffer remote access may be associated with an identified application running at the host device 704 and the client buffer include a portion of the a display area of the application.

Other implementations of the diagram of adjustable buffer remote access as shown in FIG. 7 are available. In implementations, additional elements of adjustable buffer remote access can be added, certain elements can be combined, and/or certain elements can be removed. For example, in an implementation, adjustable buffer remote access can include an additional element involving determining a margin portion size, or the element at 750 can be skipped and/or omitted for one or more frames.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIGS. 1-3.

Further, for simplicity of explanation, although the figures and descriptions herein may include sequences or series of steps or stages, elements of the methods disclosed herein can occur in various orders or concurrently. Additionally, elements of the methods disclosed herein may occur with other elements not explicitly presented and described herein. Furthermore, not all elements of the methods described herein may be required to implement a method in accordance with the disclosed subject matter.

The implementations of the computing and communication devices (and the algorithms, methods, or any part or parts thereof, stored thereon or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the computing and communication devices do not necessarily have to be implemented in the same manner.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method of adjustable buffer remote access, the method comprising:
   generating, at a client device, a client display buffer request indicating a portion of a display area of an operating environment of a host device;
   transmitting the client display buffer request to the host device;
   receiving a rendered buffer portion including a rendering of a representation of the portion of the display area of the operating environment of the host device, wherein the rendered buffer portion includes a client display portion and a margin portion;
   presenting the client display portion as a window into the display area of the operating environment of the host device.

2. The method of claim 1, wherein transmitting the client display buffer request includes transmitting via an electronic communication network and receiving the rendered buffer portion includes receiving via the electronic communication network.

3. The method of claim 1, further comprising initiating an adjustable buffer remote access session, wherein initiating the adjustable buffer remote access session includes:
   receiving host display information indicating the display area; and
   generating the client display buffer request based on the host display information.

4. The method of claim 3, wherein the host display information includes a host width and a host height, and the client display buffer request includes a buffer width, a buffer height, a vertical buffer offset, and a horizontal buffer offset.

5. The method of claim 1, wherein receiving the rendered buffer portion includes receiving a series of frames.

6. The method of claim 1, wherein presenting the client display portion includes outputting a portion of the rendered buffer portion corresponding to the client display portion to a graphical display device of the client device.

7. The method of claim 1, wherein presenting the client display portion includes identifying the client display portion based on a difference between the rendered buffer portion and the margin portion.

8. The method of claim 1, wherein presenting the client display portion includes identifying the margin portion based on a margin size.

9. The method of claim 8, further comprising dynamically adjusting the margin size.

10. The method of claim 1, further comprising:
    receiving an indication of a client display portion change from a user input device of the client device via an operating system of the client device;
    presenting an updated client display portion based on the rendered buffer portion and the client display portion change, wherein the updated client display portion includes a portion of the margin portion;
    generating an updated client display buffer request indicating an updated portion of the display area of the operating environment of the host device based on the client display portion change;
    transmitting the updated client display buffer request to the host device;
    receiving an updated rendered buffer portion including a rendering of a representation of the updated portion of the display area of the operating environment of the host device, wherein the updated rendered buffer portion includes the updated client display portion and an updated margin portion; and
    presenting the updated client display portion.

11. The method of claim 10, wherein the client display portion change indicates a change in position, size, or zoom of the client display portion relative to the representation of the display area of the operating environment of the host device.

12. The method of claim 10, wherein receiving the indication of the client display portion change includes receiving a gesture.

13. The method of claim 10, wherein the client display portion change is smaller than the margin portion.

14. The method of claim 10, wherein the client display portion change is larger than the margin portion.

15. The method of claim 10, wherein presenting the updated client display portion based on the rendered buffer portion and the client display portion change and transmitting the updated client display buffer request to the host device are performed concurrently.

16. A method of adjustable buffer remote access, the method comprising:
   initiating an adjustable buffer remote access session, wherein initiating the adjustable buffer remote access session includes:
      receiving host display information indicating a display area of an operating environment of a host device,
      generating, at a client device, a client display buffer request indicating a portion of the display area of the operating environment of the host device, and
      transmitting the client display buffer request to the host device via an electronic communication network;
   receiving, via the electronic communication network, a rendered buffer portion including a rendering of a representation of the portion of the display area of the operating environment of the host device, wherein the rendered buffer portion includes a client display portion and a margin portion;
   identifying the client display portion based on a difference between the rendered buffer portion and the margin portion; and
   presenting the client display portion as a window into the display area of the operating environment of the host device by outputting a portion of the rendered buffer portion corresponding to the client display portion to a graphical display device of the client device.

17. The method of claim 16, wherein receiving the rendered buffer portion includes receiving a series of frames.

18. The method of claim 16, further comprising:
   receiving an indication of a client display portion change from a user input device of the client device via an operating system of the client device, wherein the client display portion change indicates a change in position, size, or zoom of the client display portion relative to the representation of the display area of the operating environment of the host device;
   presenting an updated client display portion based on the rendered buffer portion and the client display portion change, wherein the updated client display portion includes a portion of the margin portion;
   generating an updated client display buffer request indicating an updated portion of the display area of the operating environment of the host device based on the client display portion change;
   transmitting the updated client display buffer request to the host device;
   receiving an updated rendered buffer portion including a rendering of a representation of the updated portion of the display area of the operating environment of the host device, wherein the updated rendered buffer portion includes the updated client display portion and an updated margin portion; and
   presenting the updated client display portion.

19. The method of claim 10, wherein presenting the updated client display portion based on the rendered buffer portion and the client display portion change and transmitting the updated client display buffer request to the host device are performed concurrently.

20. A method of adjustable buffer remote access, the method comprising:
   initiating an adjustable buffer remote access session, wherein initiating the adjustable buffer remote access session includes:
      receiving host display information indicating a display area of an operating environment of a host device,
      generating, at a client device, a client display buffer request indicating a portion of the display area of the operating environment of the host device, and
      transmitting the client display buffer request to the host device via an electronic communication network;
   receiving, via the electronic communication network, a rendered buffer portion including a rendering of a representation of the portion of the display area of the operating environment of the host device, wherein the rendered buffer portion includes a client display portion and a margin portion;
   presenting the client display portion as a window into the display area of the operating environment of the host device by outputting a portion of the rendered buffer portion corresponding to the client display portion to a graphical display device of the client device;
   receiving an indication of a client display portion change from a user input device of the client device via an operating system of the client device, wherein the client display portion change indicates a change in position, size, or zoom of the client display portion relative to the representation of the display area of the operating environment of the host device;
   presenting an updated client display portion based on the rendered buffer portion and the client display portion change, wherein the updated client display portion includes a portion of the margin portion;
   transmitting an updated client display buffer request to the host device indicating an updated portion of the display area of the operating environment of the host device based on the client display portion change;
   receiving an updated rendered buffer portion including a rendering of a representation of the updated portion of the display area of the operating environment of the host device, wherein the updated rendered buffer portion includes the updated client display portion and an updated margin portion; and
   presenting the updated client display portion.

* * * * *